United States Patent
Ishibe et al.

(10) Patent No.: US 10,175,918 B2
(45) Date of Patent: Jan. 8, 2019

(54) INFORMATION PROCESSING APPARATUS AND NON-TRANSITORY COMPUTER READABLE MEDIUM

(71) Applicant: FUJI XEROX CO., LTD., Tokyo (JP)

(72) Inventors: Mitsuhiro Ishibe, Kanagawa (JP); Taku Nishio, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/485,528

(22) Filed: Apr. 12, 2017

(65) Prior Publication Data
US 2018/0113656 A1   Apr. 26, 2018

(30) Foreign Application Priority Data
Oct. 21, 2016   (JP) .................. 2016-206969

(51) Int. Cl.
*G03B 35/14* (2006.01)
*G06F 3/12* (2006.01)

(52) U.S. Cl.
CPC .......... *G06F 3/1206* (2013.01); *G06F 3/1247* (2013.01); *G06F 3/1288* (2013.01); *G06F 3/1245* (2013.01)

(58) Field of Classification Search
CPC ...................................... G06F 3/1206
See application file for complete search history.

(56) References Cited

U.S. PATENT DOCUMENTS

| | | | |
|---|---|---|---|
| 6,515,756 B1* | 2/2003 | Mastie .................. | G06F 3/1205 358/1.15 |
| 2014/0078527 A1* | 3/2014 | Ono ...................... | G06F 3/1211 358/1.9 |
| 2014/0104645 A1* | 4/2014 | Hayakawa ............ | G06F 3/1297 358/1.15 |

OTHER PUBLICATIONS

Jul. 26, 2018 Examination Report issued in Australian Patent Application No. 2017203907.

* cited by examiner

*Primary Examiner* — King Poon
*Assistant Examiner* — Michael Burleson
(74) *Attorney, Agent, or Firm* — Oliff PLC

(57) ABSTRACT

An information processing apparatus includes a transformation rule determining unit that determines a transformation rule for transforming print attribute information representing an attribute of a print job, based on at least one of a source data format and a target data format of the print attribute information, and a data format transforming unit that transforms the data format of the print attribute information from the source data format into the target data format in accordance with the determined transformation rule.

7 Claims, 6 Drawing Sheets

FIG. 4

```
<?xml version="1.0" encoding="UTF-8"?>
<xsl:stylesheet version="1.0"
  xmlns:xsl="http://www.w3.org/1999/XSL/Transform">
  <!--TRANSFORMATION RULE-->
  <xsl:template match="from-attribute">
    <to-attribute><xsl:value-of select="."/></to-attribute>
  </xsl:template>
  ...
</xsl:stylesheet>
```

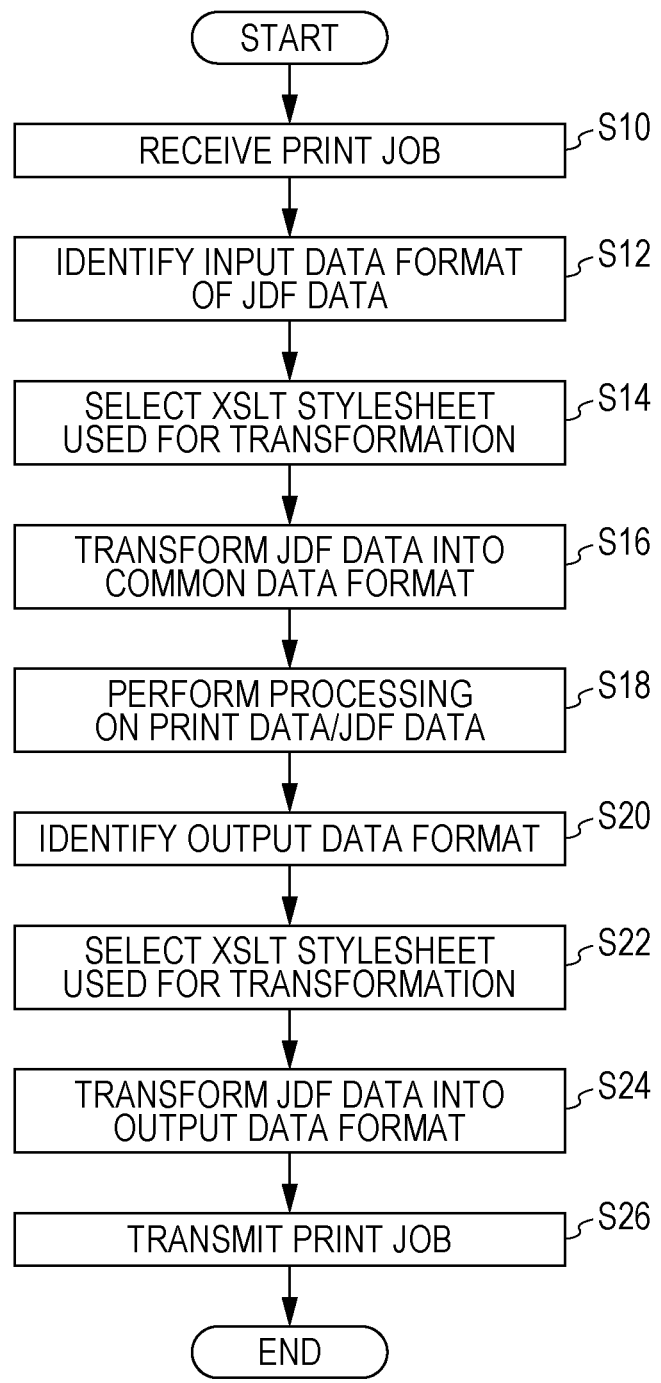

INFORMATION PROCESSING APPARATUS AND NON-TRANSITORY COMPUTER READABLE MEDIUM

CROSS-REFERENCE TO RELATED APPLICATIONS

This application is based on and Claims priority under 35 USC 119 from Japanese Patent Application No. 2016-206969 filed Oct. 21, 2016.

BACKGROUND

Technical Field

The present invention relates to an information processing apparatus and a non-transitory computer readable medium.

SUMMARY

According to an aspect of the invention, there is provided an information processing apparatus including a transformation rule determining unit that determines a transformation rule for transforming print attribute information representing an attribute of a print job, based on at least one of a source data format and a target data format of the print attribute information, and a data format transforming unit that transforms a data format of the print attribute information from the source data format into the target data format in accordance with the determined transformation rule.

BRIEF DESCRIPTION OF THE DRAWINGS

Exemplary embodiment of the present invention will be described in detail based on the following figures, wherein:

FIG. 4 illustrates an example of the contents of an XSLT stylesheet;

FIG. 6 is a flowchart of a process executed by the print job management server according to the exemplary embodiment.

DETAILED DESCRIPTION

Hereinafter, an exemplary embodiment of the present invention will be described.

Figure 1:
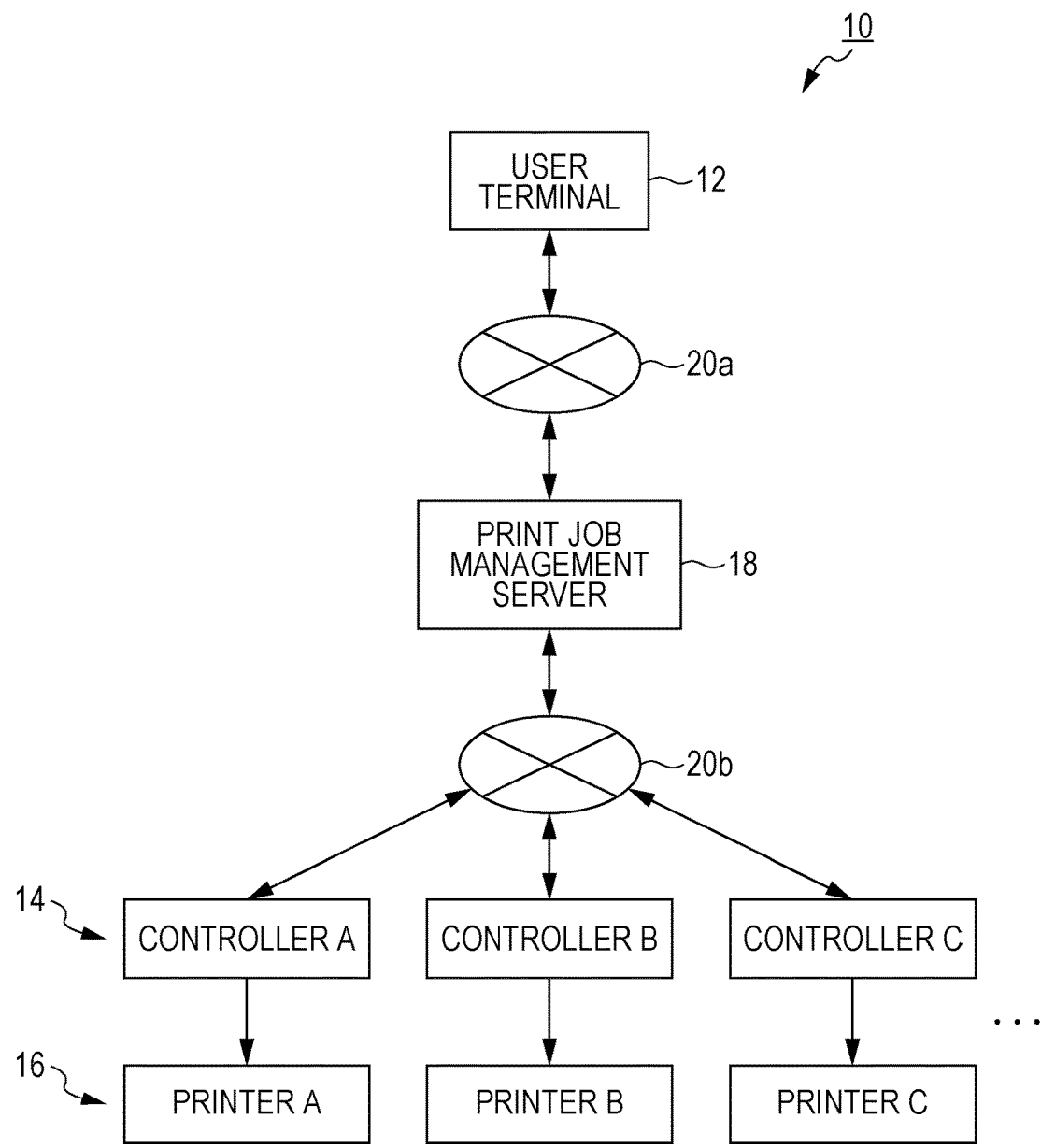
FIG. 1 schematically illustrates the configuration of a print system according to an exemplary embodiment.

FIG. 1 schematically illustrates the configuration of a print system 10 according to the exemplary embodiment. The print system 10 includes a user terminal 12, a group of controllers 14, a group of printers 16, and a print job management server 18, which serves as an information processing apparatus. The user terminal 12 and the print job management server 18 are connected in a manner that allows their communication via a communication line 20a such as the Internet or a local area network (LAN). The print job management server 18 and the group of controllers 14 are likewise connected in a manner that allows their communication via a communication line 20b such as the Internet or a LAN. Although FIG. 1 depicts a single user terminal 12, the print system 10 may include multiple user terminals 12.

Each controller included in the group of controllers 14 corresponds to each individual printer included in the group of printers 16. Each set of a controller and a printer constitutes a print processing apparatus. In the exemplary embodiment, a set of Controller A and Printer A is provided by Company A, a set of Controller B and Printer B is provided by Company B, and a set of Controller C and Printer C is provided by Company C. Although FIG. 1 depicts three sets of a controller and a printer, the print system 10 may include any other number of such sets. Although the group of printers 16 is depicted in FIG. 1 to be connected to the print job management server 18 via the group of controllers 14, the group of printers 16 may be able to communicate with the print job management server 18 without the intermediation of the group of controllers 14.

The user terminal 12, which is used by the operator (user) of the print system 10, may be a general-purpose computer. The user terminal 12 includes a control unit such as a central processing unit (CPU), a storage unit such as a read only memory (ROM), a random access memory (RAM), or a hard disk, an input unit such as a mouse or a keyboard, a display such as a liquid crystal display, and a communication unit such as a network adapter that is used to communicate with the print job management server 18 via the communication line 20a. Access to the print job management server 18 from the user terminal 12 can be made by using a general-purpose browser such as a web browser.

The user terminal 12 generates a print job in accordance with a user's instruction, and transmits the print job to the print job management server 18. Further, the user terminal 12 generates print attribute information, which represents the attributes of a print job, in accordance with a user's instruction. In the exemplary embodiment, print attribute information includes JDF data and Job Messaging Format (JMF) data.

JDF data is generated in accordance with the JDF standard, and specifically represents data written in Extensible Markup Language (XML). JDF data represents various settings for a print job. For example, JDF data includes information on various settings, such as the number of copies to print, duplex/simplex printing, which paper tray to use, the type of RIP, color settings, image quality settings, paper settings, output method (e.g., layout or watermarking), and finish settings (e.g., folding, trimming, or case binding).

JMF data also represents data generated in accordance with the JDF standard and written in XML. JMF data includes information about various instructions given to controllers and printers. Such instructions information includes, for example, instructions given to controllers and printers to execute processes, or information representing the contents of queries.

JDF data and JMF data are each included in a print job. In other words, a print job includes print data representing a document to be printed, JDF data, and JMF data. In the exemplary embodiment, JDF data and JMF data are respectively organized in the form of JDF and JMF files, which are included in a print job.

The user terminal 12 is capable of generating print attribute information in multiple data formats. Although print attribute information is generated in accordance with the JDF standard, if, for example, a unique description defined by Company A, Company B, or Company C is included in the print attribute information of the corresponding company, then each print attribute information defined by each of these companies differs in data format. In the exemplary embodiment, it is assumed that the user terminal 12 is capable of generating print attribute information in a Company A's format, a Company B's format, a Company C's format, or a data format defined by a company other than these companies. In some cases, the data format of print attribute information may differ even for the same company, depending on the controller or printer used.

Each controller included in the group of controllers 14 functions as a digital front end (DFE), and performs processing on a print job that is received from the user terminal 12 via the print job management server 18. Specifically, each controller performs processing on print data to generate raster data that can be processed by the corresponding printer. In processing print data, each controller references print attribute information and, if necessary, updates the print attribute information. In the exemplary embodiment, each controller is provided by the corresponding company as described above. Thus, in some cases, each controller is able to process (e.g., reference or update) print attribute information that is in the format of the corresponding company but unable is process print attribute information that is in the format of another company. For example, in some cases, Controller A provided by Company A is unable to process print attribute information that is in the Company B's format.

Each controller transmits state information, which represents the state of the controller itself or the corresponding printer, to the print job management server 18. For example, state information includes information about the function that can be implemented by the corresponding controller or printer (e.g., whether duplex printing is supported), or information about the paper being loaded in the tray of the corresponding printer. In the exemplary embodiment, state information is also written in XML in accordance with the JDF standard. The data format of state information also differs for each company. For example, the data format of state information transmitted by Controller A and the data format of state information transmitted by Controller B differ from each other. From the perspective of the print job management server 18, this means that the print job management server 18 receives state information of multiple data formats from the group of controllers 14.

Each printer included in the group of printers 16 executes printing based on raster data received from the corresponding controller.

The print job management server 18 is implemented by, for example, a server computer. The print job management server 18 performs processes such as management of a print job transmitted from the user terminal 12, processing on a print job, and provision of a user interface to the user. As management of a print job, for example, the print job management server 18 distributes a print job received from the user terminal 12 to each controller. The user may specify the controller to which a print job is to be distributed. As processing on a print job, for example, the print job management server 18 performs pre-press processes on print data. Pre-press processes include processes such as pre-flighting, page numbering, imposition, and watermarking. In performing the pre-press processes, the print job management server 18 performs processing on print attribute information, that is, referencing and updating of print attribute information. As provision of a user interface, for example, the print job management server 18 displays, on the display of the user terminal 12, a screen showing the processing status of each print job.

The print job management server 18 provides integrated management of print jobs transmitted to individual sets of a controller and a printer, or information related to the print jobs (such as print attribute information and state information). This allows for, for example, more efficient processing of print jobs, more efficient management of the operating state of each set of a controller and a printer, and enhanced usability for the user.

The general configuration of the print system 10 is as described above. Hereinafter, the print job management server 18 will be described in detail with reference to FIG. 2.

Figure 2:
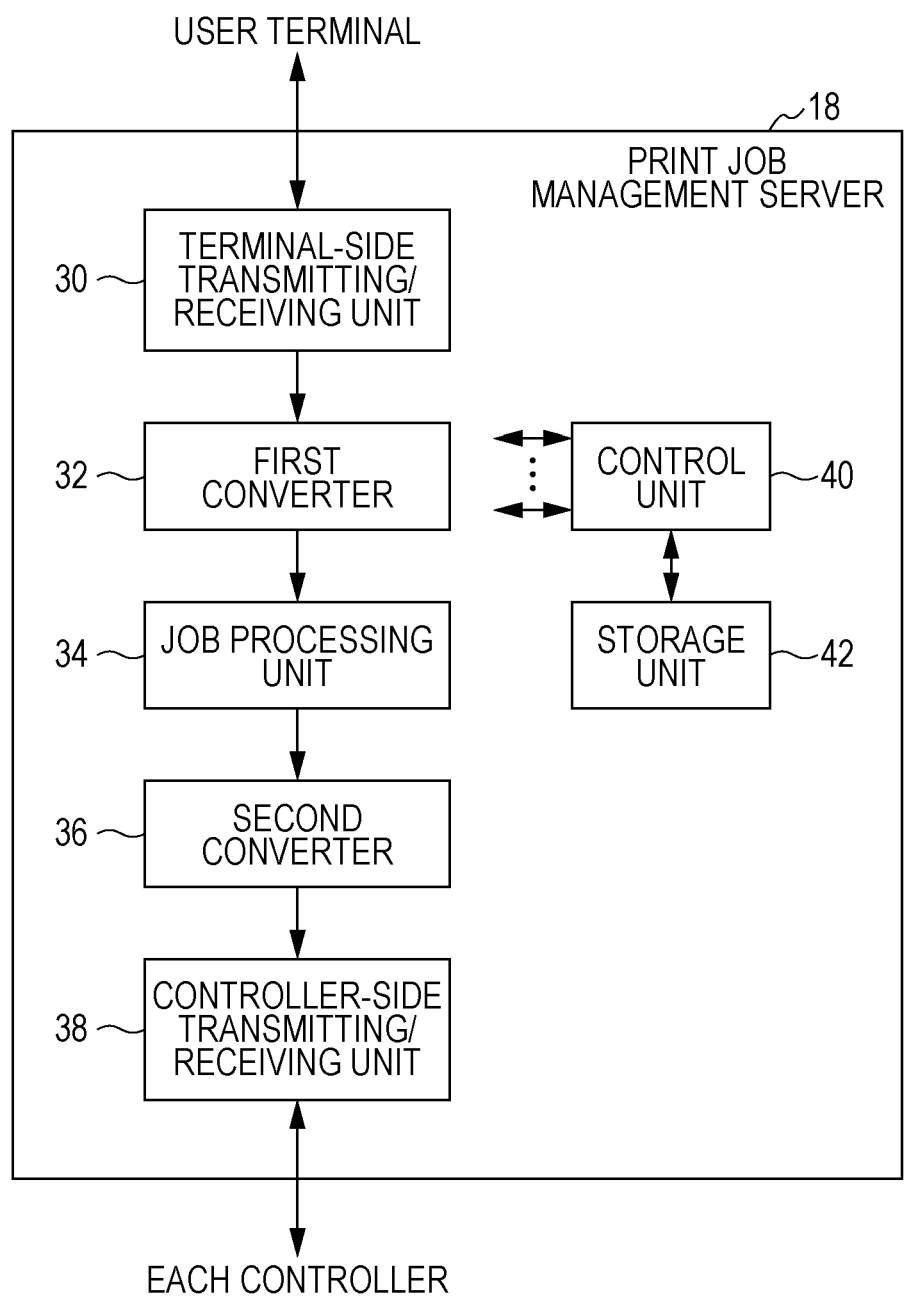
FIG. 2 is a functional block diagram of a print job management server.

FIG. 2 is a functional block diagram of the print job management server 18.

A terminal-side transmitting/receiving unit 30 is implemented by, for example, a network adapter, and used to communicate with the user terminal 12 via the communication line 20*a*. Specifically, the terminal-side transmitting/receiving unit 30 receives a print job (including print data, JDF data, and JMF data) from the user terminal 12. As described above, the user terminal 12 is capable of generating JDF data and JMF data of various data formats. Thus, a print job received by the terminal-side transmitting/receiving unit 30 can include JDF data and JMF data of various data formats. The terminal-side transmitting/receiving unit 30 also receives, from the user terminal 12, information about various instructions given from the user (e.g., information that specifies the transmit destination of a print job). Further, in accordance with control by a control unit 40 described later, the terminal-side transmitting/receiving unit 30 transmits, to the user terminal 12, various screen information for displaying various screens on the display of the user terminal 12.

A first converter 32 transforms the data format of JDF data included in a print job received by the terminal-side transmitting/receiving unit 30 into a pre-defined common data format. The data format of JDF data received by the terminal-side transmitting/receiving unit 30 is herein referred to as input data format. In other words, the first converter 32 transforms the data format of JDF data from an input data format, which is a source data format, into a common data format, which is a target data format. A common data format is a format suitable for processing in a job processing unit 34 described later. Although the data format of JMF data is transformed by the first converter 32 (and a second converter 36 described later) in the exemplary embodiment, the data format of JMF data may be similarly transformed as required. The details of a process executed by the first converter 32 will be described later.

The first converter 32 also transforms the data format of state information transmitted from the group of controllers 14 into a pre-defined data format (suitable for processing in the print job management server 18).

The job processing unit 34 performs the above-mentioned pre-press processes on print data received by the terminal-side transmitting/receiving unit 30. In performing the pre-press processes, the job processing unit 34 references the JDF data of a common data format transformed by the first converter 32. Further, as required, the job processing unit 34 updates the JDF data of a common data format. Thus, the job processing unit 34 also functions as a print-attribute-information processing unit.

The second converter 36 transforms the JDF data of a common data format transformed by the first converter 32 into an output data format compatible with a controller to which a print job is transmitted. In other words, the second converter 36 transforms the data format of JDF data from a common data format, which is a source data format, into an output data format, which is a target data format. The output data format is a format suitable for processing by a controller or printer at the destination of a print job. The details of a process executed by the second converter 36 as well will be described later.

As with the terminal-side transmitting/receiving unit 30, a controller-side transmitting/receiving unit 38 is also implemented by, for example, a network adapter, and used to communicate with the group of controllers 14 via the communication line 20b. Specifically, the controller-side transmitting/receiving unit 38 transmits a print job to a user-specified controller. The print job to be transmitted at this time includes JDF data (and JMF data) that has been transformed by the first converter 32 into a common data format, processed by the job processing unit 34, and then transformed by the second converter 36 into an output data format compatible with the controller at the destination. Further, the controller-side transmitting/receiving unit 38 receives state information from the group of controllers 14.

The control unit 40 is implemented by, for example, a CPU, and controls various units of the print job management server 18 in accordance with a program stored in a storage unit 42. In particular, the control unit 40 performs the process of determining the controller to which to transmit a print job, based on instruction information supplied from the user terminal 12. Alternatively, the control unit 40 performs the process of, based on state information received from the group of controllers 14, transmitting screen information used for displaying the state information on the display of the user terminal 12.

The storage unit 42 is implemented by, for example, a ROM, a RAM, or a hard disk. The storage unit 42 stores a program for causing various units of the print job management server 18 to function. The storage unit 42 also stores various information (described later) necessary for the first converter 32 and the second converter 36 to perform transformations.

The general configuration of the print job management server 18 is as described above. Of the components illustrated in FIG. 2, the first converter 32, the job processing unit 34, and the second converter 36 may each be implemented by, for example, use of hardware such as an electric/electronic circuit or a processor. As required, a device such as a memory may be used in the implementation. Further, the function corresponding to each of the above-mentioned units may be implemented by cooperation of hardware such as a CPU, processor, or memory, and software (program) that defines the operation of the CPU or processor.

Figure 3:
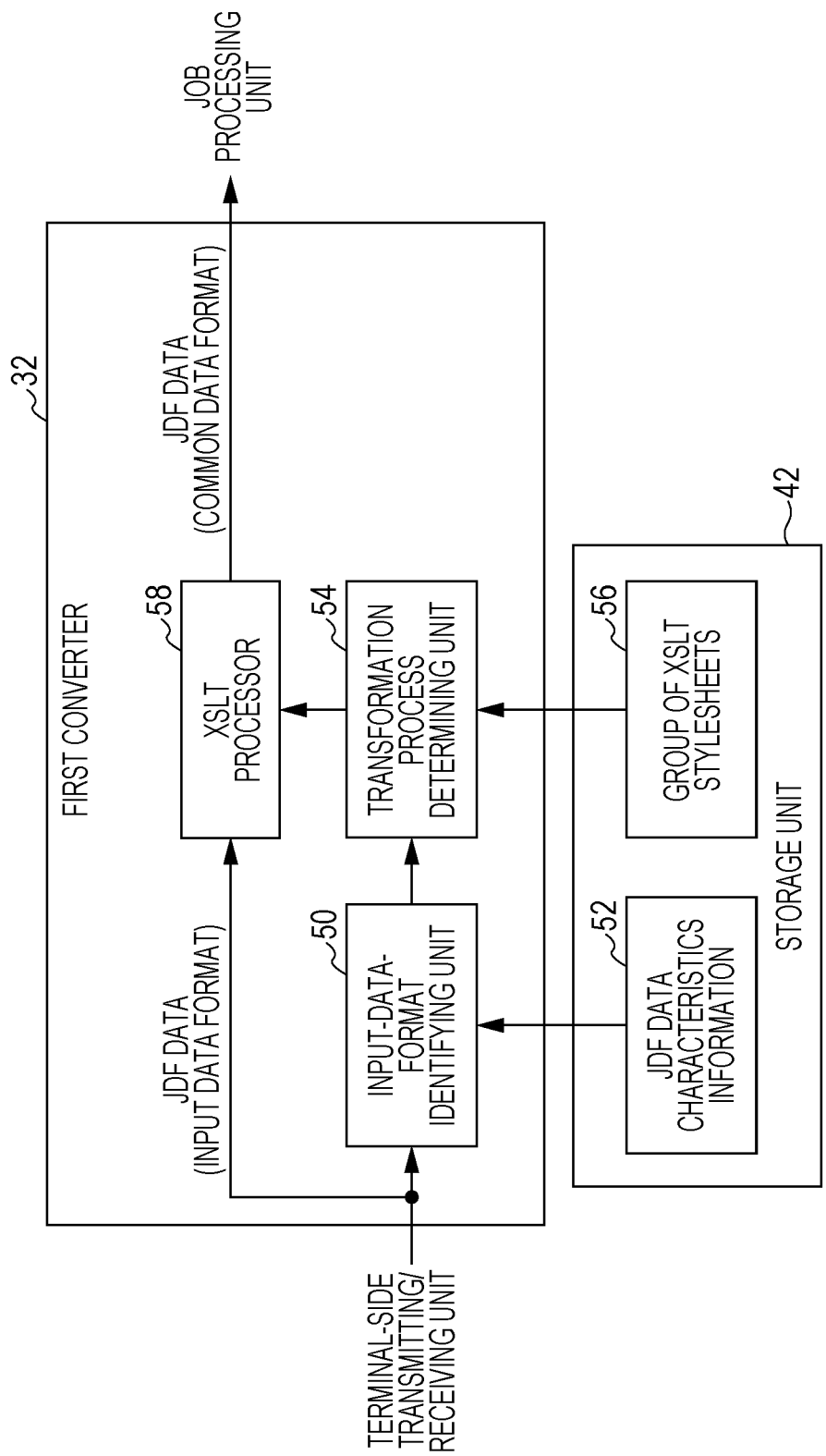
FIG. 3 is a functional block diagram of a first converter.

Hereinafter, the first converter 32 will be described in detail with reference to FIG. 3. FIG. 3 is a functional block diagram of the first converter 32.

An input-data-format identifying unit 50 identifies the data format (input data format) of JDF data included in a print job received by the terminal-side transmitting/receiving unit 30. For example, the input-data-format identifying unit 50 identifies whether the input data format is a Company A's format, a Company B's format, a Company C's format, or any other data format. Specifically, the input-data-format identifying unit 50 identifies the data format based on JDF data characteristics information 52 stored in the storage unit 42.

The JDF data characteristics information 52 represents characteristics possessed by JDF data of each individual data format. For example, if JDF data of the Company A's format has a unique tag named "AAA" in its XML data structure, then the tag named "AAA" is included in the JDF data characteristics information 52 as a characteristic of the Company A's format. If JDF data of the Company B's format has unique data named "bbb", then the data named "bbb" is included in the JDF data characteristics information 52 as a characteristic of the Company B's format. The JDF data characteristics information 52 may be generated in advance by, for example, the administrator of the print job management server 18 and stored in the storage unit 42.

The input-data-format identifying unit 50 identifies the input data format based on the contents of JDF data of the input data format and the JDF data characteristics information 52. For example, if none of the characteristics included in the JDF data characteristics information 52 is discovered from the JDF data, and thus the input data format is not successfully identified, the input-data-format identifying unit 50 identifies the input data format to be a predetermined default data format (e.g., the Company A's format).

The user is able to transmit information that identifies the input data format from the user terminal 12 to the print job management server 18. In this case, the input-data-format identifying unit 50 may identify the input data format based on the information transmitted from the user terminal 12.

A transformation process determining unit 54 as a transformation rule determining unit determines, based on the input data format identified by the input-data-format identifying unit 50, the transformation process (transformation rule) to be applied to transform JDF data from the input data format into a common data format. Since JDF data is written in XML, in the exemplary embodiment, a data format transformation is performed based on an XSL Transformation (XSLT) stylesheet representing a transformation rule. An XSLT stylesheet is used to transform an XML document. In other words, the transformation process determining unit 54 determines which XSLT stylesheet is to be used to transform the data format of JDF data, thus determining the transformation rule applied to the transformation.

In the exemplary embodiment, the storage unit 42 as a memory stores a group of XSLT stylesheets 56 including multiple XSLT stylesheets. Each XSLT stylesheet included in the group of XSLT stylesheets 56 corresponds to each individual predicted input format (i.e., each individual data format that JDF data included in a print job received by the print job management server 18 can take), and is used to transform the corresponding input data format into a common data format. For example, the group of XSLT stylesheets 56 includes an XSLT stylesheet used for transformation from the Company A's format into a common data format, an XSLT stylesheet used for transformation from the Company B's format into a common data format, and an XSLT stylesheet used for transformation from the Company C's format into a common data format. The group of XSLT stylesheets 56 may be generated in advance by, for example, the administrator of the print job management server 18 and stored in the storage unit 42. Further, each stylesheet included in the group of XSLT stylesheets 56 may be allowed to be rewritten based on state information transmitted from the group of controllers 14. The state information received from the group of controllers 14 may be transformed by the first converter 32 into a pre-defined data format as described above, or may be transmitted to the control unit 40 as it is. In other words, the control unit 40 may receive state information transmitted from the group of controllers 14 as it is, and rewrite the corresponding XSLT stylesheet based on the received state information.

FIG. 4 illustrates an example of the contents of an XSLT stylesheet. An XSLT stylesheet is also written in XML. The XML data illustrated in FIG. 4 contains the following description in the fifth and sixth lines from the top:
<xsl:template match="from-attribute"><to-attribute><xsl:value-of select="."/></to-attribute>

This description means that a tag name "from-attribute" in JDF data of an input data format is transformed into a tag name "to-attribute". Further, the description "<xsl:value-of select="."/>" means that the data of the tag "from-attribute" is retained as the data of the tag "to-attribute". Although FIG. 4 is directed to an example of an XSLT stylesheet used for tag name transformation in JDF data, that is, transformation of the data structure of JDF data, an XSLT stylesheet may include not only a process for transforming data structure but also a process for transforming the data itself.

Returning to FIG. 3, the transformation process determining unit 54 selects one XSLT stylesheet from the group of XSLT stylesheets 56 based on the input data format identified by the input-data-format identifying unit 50. For example, if the input data format is identified to be the Company A's format, the transformation process determining unit 54 selects an XSLT stylesheet used for transformation from the Company A's format into a common data format. The transformation rule to be applied to the transformation of JDF data is thus determined.

An XSLT processor 58 as a data format transforming unit transforms the data format of JDF data based on the XSLT stylesheet selected by the transformation process determining unit 54. When the XSLT processor 58 applies the selected XSLT stylesheet to the JDF data of the input data format, the JDF data is transformed into a common data format. At this time, if the JDF data of the input data format possesses a unique characteristic, and the selected XSLT stylesheet does not contain a description for transforming the unique characteristic into one compatible with a common data format (i.e., if the JDF data of the input data format includes a unique characteristic that is not transformable into a common data format), such a characteristic may be allowed to remain in the common data format as it is.

With the first converter 32, JDF data included in a print job received by the terminal-side transmitting/receiving unit 30 is transformed into JDF data of a common data format, irrespective of the data format of the received JDF data. Accordingly, the job processing unit 34 does not need to support JDF data of various data formats but only needs to be able to process JDF data of a common data format. This allows for simplified or faster processing in the job processing unit 34.

The first converter 32 also transforms the data format of state information transmitted from each controller. The transformation of the data format of state information may be performed similarly as described above. That is, state information characteristics information (not illustrated), which represents the characteristics of state information corresponding to each company, is stored in the storage unit 42 in advance, and based on the stored state characteristics information, the input-data-format identifying unit 50 identifies the data format of state information received by the controller-side transmitting/receiving unit 38. Then, based on the identified data format, the transformation process determining unit 54 selects an XSLT stylesheet that is stored in advance in the storage unit 42 and used to transform the state information of the identified data format into a data format suitable for processing of the state information by the print job management server 18. The XSLT processor 58 then applies the selected XSLT stylesheet to the state information, thus transforming the format of the state information. In this way, the data format of state information that differs for each controller is transformed into a specified data format. This means that, irrespective of the data format of the state information received, the print job management server 18 (e.g., the control unit 40) only needs to perform processing on data of the specified data format at all times.

Figure 5:
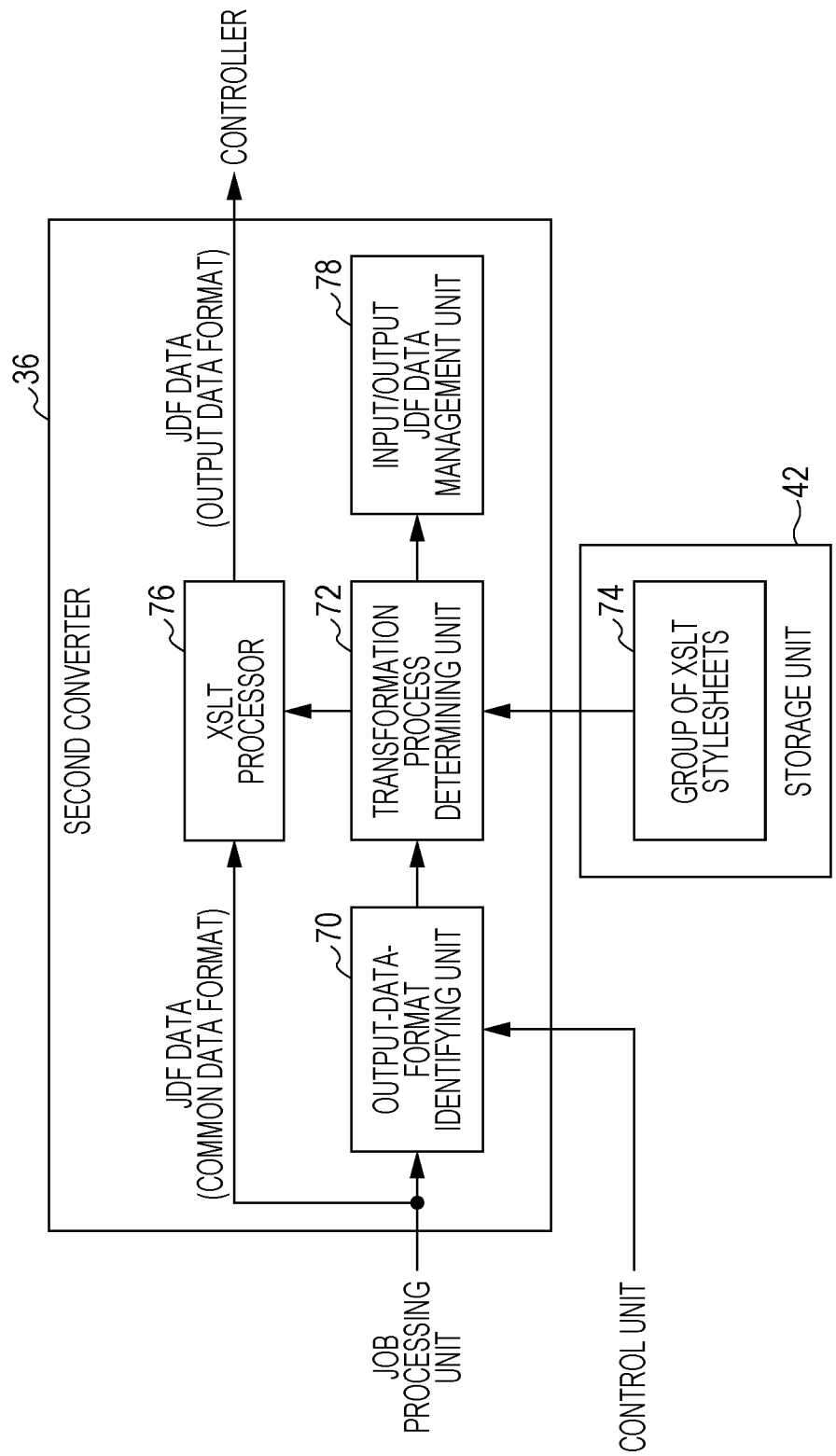
FIG. 5 is a functional block diagram of a second converter.

Hereinafter, the second converter 36 will be described in detail with reference to FIG. 5. FIG. 5 is a functional block diagram of the second converter 36.

An output-data-format identifying unit 70 identifies a target data format (output data format) for the JDF data of a common data format that has been transformed by the first converter 32 and processed by the job processing unit 34. The output data format is determined in accordance with the destination of a print job in which the JDF data is included. More specifically, the output data format is a data format suitable for processing at the destination of a print job in which the JDF data is included. For example, if a print job is to be transmitted to Controller A, the output data format is identified to be the Company A's format. As described above, the destination of a print job is specified by the user, and information representing the destination is transmitted from the user terminal 12 to the print job management server 18. When the terminal-side transmitting/receiving unit 30 receives this information, the control unit 40 transfers the information to the output-data-format identifying unit 70. The output-data-format identifying unit 70 identifies the output data format based on the information transferred from the control unit 40.

A transformation process determining unit 72 as a transformation rule determining unit determines, based on the output data format identified by the output-data-format identifying unit 70, the transformation process (transformation rule) to be applied to transform JDF data from a common data format into the output data format. As with the first converter 32, the transformation of the data format of JDF data involves determining which XSLT stylesheet is to be used to transform the data format of JDF data to thereby determine the transformation rule applied to the transformation.

The storage unit 42 stores a group of XSLT stylesheets 74. Each XSLT stylesheet included in the group of XSLT stylesheets 74 corresponds to each individual output data format that can be processed by the corresponding controller to which a print job is transmitted from the print job management server 18, and used to transform a common data format into the corresponding output data format. For example, the group of XSLT stylesheets 74 includes an XSLT stylesheet used for transformation from a common data format into the Company A's format, an XSLT stylesheet used for transformation from a common data format into the Company B's format, and an XSLT stylesheet used for transformation from a common data format into the Company C's format. The group of XSLT stylesheets 74 as well may be generated in advance by, for example, the administrator of the print job management server 18 and stored in the storage unit 42.

The transformation process determining unit 72 selects one XSLT stylesheet from the group of XSLT stylesheets 74 based on the data format identified by the output-data-format identifying unit 70, that is, the output data format. For example, if the output data format is identified to be the Company A's format, the transformation process determining unit 72 selects an XSLT stylesheet used for transformation from a common data format into the Company A's format. The transformation rule to be applied to the transformation of JDF data is thus determined.

An XSLT processor 76 as a data format transforming unit transforms the data format of JDF data based on the XSLT stylesheet selected by the transformation process determining unit 72. When the XSLT processor 76 applies the selected XSLT stylesheet to the JDF data of a common data format, the JDF data is transformed into the output data format. If JDF data of a common data format includes a unique characteristic that has not been successfully transformed by the first converter 32, such a characteristic may be allowed to remain in the output data format as it is.

An input/output JDF data management unit 78 manages JDF data of an input data format and JDF data of an output data format in association with each other. The input/output JDF data management unit 78 may cause JDF data of an input data format and JDF data of an output data format themselves to be stored in the storage unit 42 in association with each other, or may cause information representing association between the two pieces of data to be stored in the storage unit 42.

With the second converter 36, no matter which controller is selected by the user as the destination of a print job, JDF data is transformed into an output data format suitable for processing of the JDF data in the controller to which the print job is output. This ensures that the controller or printer that has received a print job from the print job management server 18 is able to process the JDF data in a suitable manner at all times.

With the combination of the first converter 32 and the second converter 36, JDF data is transformed from an input data format into a common data format once, and then transformed into an output data format suitable for the destination. This ensures that, irrespective of the data format of JDF data transmitted by the user to the print job management server 18, the JDF data can be processed in a suitable manner by any controller. Further, in processing JDF data within the print job management server 18, JDF data of a common data format can be processed at all times, which means that the print job management server 18 only needs to be able to process JDF data of a common data format.

Hereinafter, the process flow in the print job management server 18 according to the exemplary embodiment will be described with reference to the flowchart illustrated in FIG. 6.

At step S10, the terminal-side transmitting/receiving unit 30 receives a print job from the user terminal 12. It is assumed in this case that the print job includes JDF data of the Company A's format.

At step S12, the input-data-format identifying unit 50 of the first converter 32 identifies the input data format of the JDF data received at step S10. In this case, the input data format is identified to be the Company A's format.

At step S14, based on the input data format identified at step S12, the transformation process determining unit 54 of the first converter 32 selects an XSLT stylesheet used for transforming the JDF data from the group of XSLT stylesheets 56 stored in the storage unit 42. In this case, an XSLT stylesheet for transforming the data format of the JDF data from the Company A's format into a common data format is selected.

At step S16, the XSLT processor 58 of the first converter 32 applies the XSLT stylesheet selected at step S14 to the JDF data of the input data format (the Company A's format in this case) to transform the JDF data into a common data format.

At step S18, the job processing unit 34 performs processing on print data included in the print job. At this time, the job processing unit 34 performs processing (such as referencing or updating) on the JDF data of a common data format.

At step S20, the output-data-format identifying unit 70 of the second converter 36 identifies the destination controller to which the print job is to be output, based on information transmitted from the user terminal 12. The output data format of the JDF data is thus identified. It is assumed in this case that Controller B provided by Company B is specified by the user as the destination controller, and the output data format is identified to be the Company B's format.

At step S22, based on the output data format identified at step S20, the transformation process determining unit 72 of the second converter 36 selects an XSLT stylesheet used for transforming the JDF data from the group of XSLT stylesheets 74 stored in the storage unit 42. In this case, an XSLT stylesheet for transforming the data format of the JDF data from a common data format into the Company B's format is selected.

At step S24, the XSLT processor 76 of the second converter 36 applies the XSLT stylesheet selected at step S22 to the JDF data of a common data format to transform the JDF data into the output data format (Company B's format in this case).

At step S26, the controller-side transmitting/receiving unit 38 transmits, to Controller B, a print job including the print data that has been processed by the job processing unit 34 at step S18, and the JDF data that has been processed by the job processing unit 34 at step S18 and transformed into the output data format (Company B's format) at step S24.

Although an exemplary embodiment of the present invention has been described above, the present invention is not limited to the above-mentioned exemplary embodiment but various modifications are possible without departing from the scope of the present invention.

For example, although the preceding description of the exemplary embodiment is directed to a case in which the print job management server 18 includes two converters, the first converter 32 and the second converter 36, if no processing is performed on a print job in the print job management server 18, the print job management server 18 may include a single converter that combines the functions of the two converters.

In this case, each XSLT stylesheet stored in the storage unit 42 is prepared for each individual combination of input and output data formats. For example, the storage unit 42 stores stylesheets such as an XSLT stylesheet used for transformation from the Company A's format into the Company B's format, an XSLT stylesheet used for transformation from the Company A's format into the Company C's format, and an XSLT stylesheet used for transformation from the Company B's format into the Company A's format. In the converter, the transformation process determining unit 54 selects an XSLT stylesheet used for an intended transformation, based on an input data format identified by the input-data-format identifying unit 50 and an output data format identified by the output-data-format identifying unit 70. For example, if the input data format is identified to be the Company A's format, and the output data format is identified to be the Company B's format, an XSLT stylesheet used for transformation from the Company A's format into the Company B's format is selected. The XSLT stylesheet selected by the XSLT processor 58 is applied to the JDF data to directly transform the input data format (e.g., the Company A's format) into the output data format (e.g., the Company B's format), and then a print job including the resulting JDF data is transmitted to a controller (e.g., Controller B).

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following Claims and their equivalents.

What is claimed is:

1. An information processing apparatus comprising:
a processor configured to act as:
   a transformation rule determining unit that determines a transformation rule for transforming print attribute information representing an attribute of a print job, based on at least one of a source data format and a target data format of the print attribute information, the transformation rule including a first conversion from a job definition format to a common data format, and a second conversion from the common data format to an output data format suitable for processing in a controller to which the print job is output, the first conversion including selecting an XSLT stylesheet that transforms the job definition format to the common data format; and
   a data format transforming unit that transforms a data format of the print attribute information from the source data format into the target data format in accordance with the determined transformation rule, the transformation of the print attribute information including transformation of a plurality of print attribute information, at least some of the conversion thereby converting each job definition format to a single common data format; and
   a transmitting unit that transmits the print job with the transformed target data format of the print attribute information.

2. The information processing apparatus according to claim 1,
wherein the source data format comprises an input data format, the target data format comprises a pre-defined common data format, and the data format transforming unit transforms a data format of the print attribute information from the input data format into the common data format in accordance with the transformation rule determined based on the input data format, and
wherein the processor is further configured to act as:
   a print-attribute-information processing unit that processes the print attribute information of the common data format.

3. The information processing apparatus according to claim 2,
wherein the target data format comprises an output data format, the source data format comprises the common data format, and the data format transforming unit transforms a data format of the print attribute information from the common data format into the output data format in accordance with the transformation rule determined based on the output data format, and
wherein the output data format is determined in accordance with a print processing apparatus to which the print attribute information is output.

4. The information processing apparatus according to claim 1, further comprising
a memory that stores a plurality of the transformation rules,
wherein the transformation rule determining unit selects one transformation rule from the plurality of transformation rules.

5. The information processing apparatus according to claim 2, further comprising
a memory that stores a plurality of the transformation rules,
wherein the transformation rule determining unit selects one transformation rule from the plurality of transformation rules.

6. The information processing apparatus according to claim 3, further comprising
a memory that stores a plurality of the transformation rules,
wherein the transformation rule determining unit selects one transformation rule from the plurality of transformation rules.

7. A non-transitory computer readable medium storing a program causing a computer to execute a process, the process comprising:
   determining a transformation rule for transforming print attribute information representing an attribute of a print job, based on at least one of a source data format and a target data format of the print attribute information, the transformation rule including a first conversion from a job definition format to a common data format, and a second conversion from the common data format to an output data format suitable for processing in a controller to which the print job is output, the first conversion including selecting an XSLT stylesheet that transforms the job definition format to the common data format;
   transforming a data format of the print attribute information from the source data format into the target data format in accordance with the determined transformation rule, the transforming including transformation of a plurality of print attribute information, at least some of the plurality of print attribute information having a different job definition format, the first conversion thereby converting each job definition format to a single common data format; and
   transmitting the print job with the transformed target data format of the print attribute information.

* * * * *